Nov. 27, 1962   R. O. PETERSON   3,065,481
BELT BRUSH MANUFACTURE
Filed May 29, 1958   2 Sheets-Sheet 1
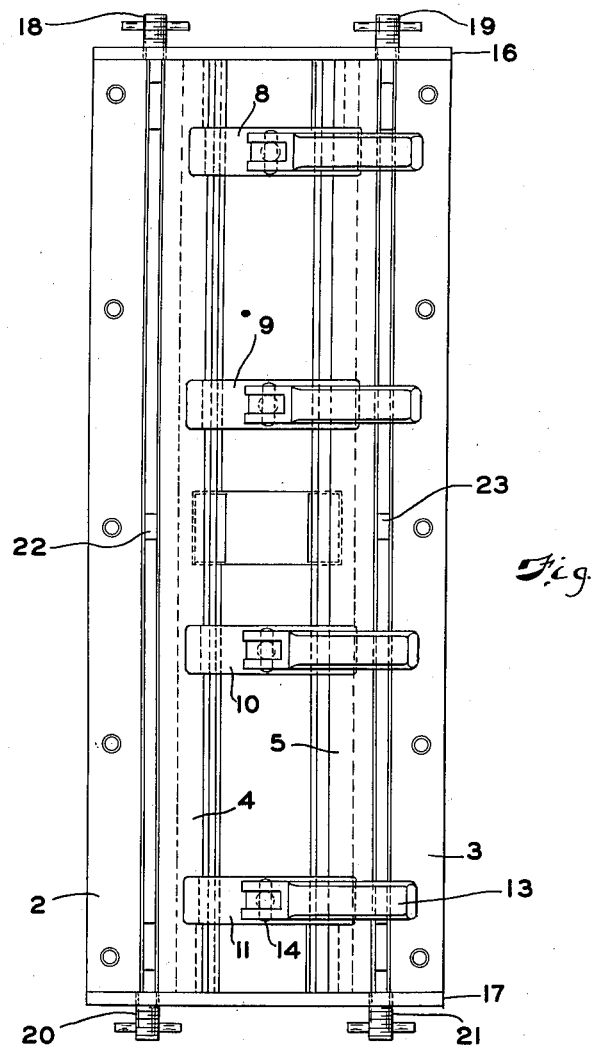
Fig. 1
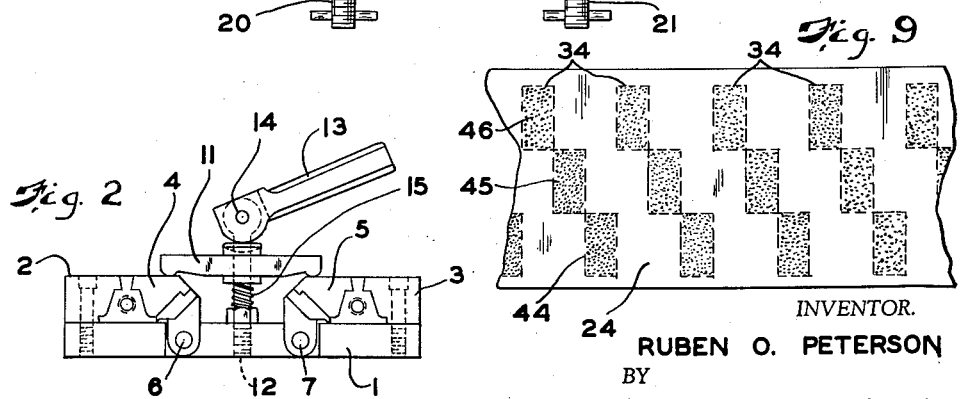
Fig. 2
Fig. 9
INVENTOR.
RUBEN O. PETERSON
BY
Oberlin & Limbach
ATTORNEYS

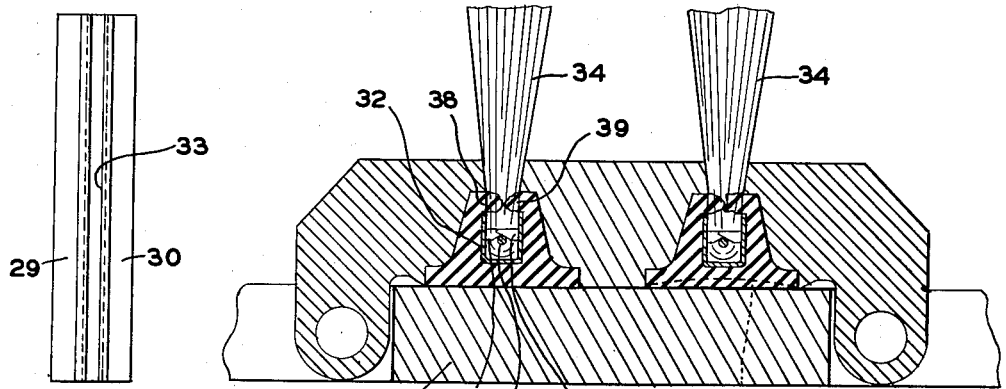
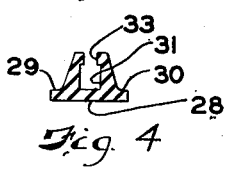
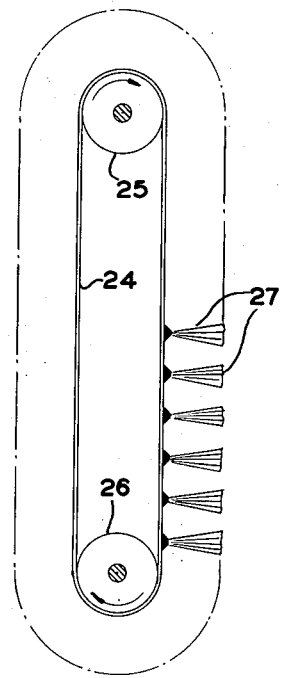
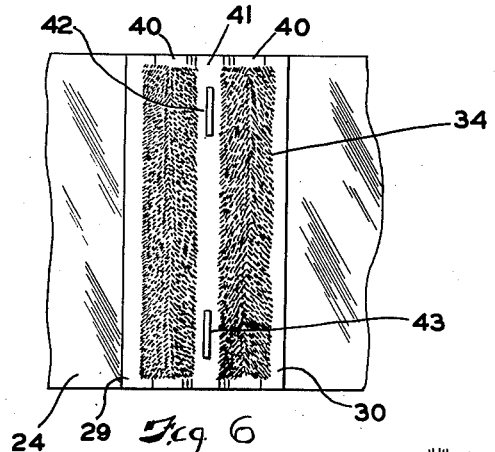
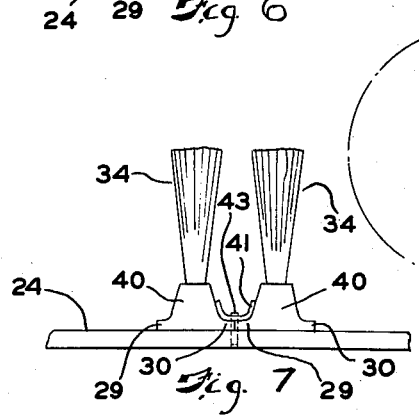
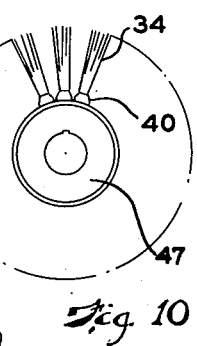

United States Patent Office 3,065,481
Patented Nov. 27, 1962

3,065,481
BELT BRUSH MANUFACTURE
Ruben O. Peterson, University Heights, Ohio, assignor to The Osborn Manufacturing Company, Cleveland, Ohio, a corporation of Ohio
Filed May 29, 1958, Ser. No. 738,876
11 Claims. (Cl. 15—183)

This invention relates as indicated to belt brush manufacture, and more particularly to a novel belt brush construction.

In my prior co-pending application Serial No. 640,652, filed February 18, 1957, for "Brush Element and Belt Brush Construction," of which this application is a continuation-in-part, I disclose certain novel elongated brush elements particularly adapted for mounting transversely of continuous belts of rubber or webbing, for example. It is important that such elongated brush elements, including lengths of brush strip such as that disclosed and claimed in my prior Patent 2,303,386, be firmly secured to the endless belt and also braced to withstand the forces to which they are subjected in operation, it being appreciated that the layers of brush material of the lengths of brush strip will ordinarily engage the work more or less laterally thereof. Belt brushes are decidedly superior for certain types of brushing operations but nevertheless in order to be competitive with other types of brushes, the cost of manufacture must be kept within reason.

Another object is to provide means for mounting lengths of brush strip upon supporting belts and the like whereby such brush strip may be both firmly secured to the belt and also laterally braced to withstand the forces imposed thereon in use.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a top plan view of a mold designed for molding a body of elastomeric material or the like about lengths of brush strip for subsequent mounting on endless belts;

FIG. 2 is an end elevational view of the mold of FIG. 1, with the end plate removed;

FIG. 3 is a top view of a length of extruded uncured elastomeric material adapted to receive a length of brush strip such as that disclosed in my prior Patent 2,303,386 prior to being placed in the mold of FIGS. 1 and 2;

FIG. 4 is an end view of the extruded strip of elastomeric material shown in FIG. 3;

FIG. 5 is a transverse section on an enlarged scale through a multiple mold of the general FIG. 1 type showing lengths of brush strip mounted in the extruded strips of FIGS. 3 and 4, in process of being molded;

FIG. 6 is a fragmentary top plan view of a portion of a belt brush in accordance with my invention;

FIG. 7 is a side elevational view of the FIG. 6 construction;

FIG. 8 is a diagrammatic showing of an endless belt brush of the general type with which this invention is concerned;

FIG. 9 indicates an alternative mode of mounting lengths of brush strip on a belt or cylinder to achieve a generally helical effect; and FIG. 10 is a diagrammatic end view of a rotary brush comprising a cylindrical hub or core having my new brush elements mounted thereon.

Referring now more particularly to said drawing and especially FIGS. 1 and 2 thereof, the mold there illustrated may comprise a base 1 mounting a pair of elongated molds comprising outer strips 2 and 3 and inner strips 4 and 5, these later being pivotally mounted at 6 and 7 respectively so that they may be swung toward each other to open the molds. A plurality of hold-down bar clamps 8, 9, 10 and 11 are mounted on vertical studs such as 12 intermediate strips 4 and 5 adapted to bear downwardly on such strips through the action of eccentric toggle handle 13 pivotally mounted at 14 on the upper end of the stud, against the action of compression spring 15. The ends of the mold cavities are closed by end plates 16 and 17 secured to the end of base 1 (end plate 17 is removed in the FIG. 2 view).

Adjusting screws 18, 19, 20 and 21 are threaded in the respective end plates and project into the corresponding mold cavities longitudinally thereof to engage slidable end pieces which fit the mold cavity and are movable by said adjusting screws to press against the lengths of brush strip placed within such cavities to make the length of the cavity exactly conform to the length to be molded at a given time. Spacer elements 22 and 23 are also slidable pieces which fit the mold cavity and are adapted to be placed between lengths of brush strip whenever more than one length is to be molded in a single long cavity. Accordingly, elastomeric material may be molded to more than two lengths of brush strip in the FIG. 1 mold assembly. Likewise, such assembly may be duplicated on a single base to provide a plurality of parallel units of the sort indicated in fragmentary FIG. 5. The mold parts may desirably be of aluminum.

Referring now more particularly to FIG. 8 of the drawing, belt brushes produced in accordance with this invention may be of the type generally there indicated comprising a flat endless belt 24 which may be of metal, webbing, elastomeric material, or any combination of the same, as well known in the art, mounted for travel about two or more spaced rolls or pulleys 25 and 26. Elongated brush elements 27 produced in accordance with this invention are mounted on such endless belt extending transversely thereof.

While practically any form of known brush strip having an elongated back and a layer of brush material or spaced tufts of brush material extending therefrom may be utilized, I ordinarily prefer to employ brush strip of the type disclosed in my prior Patent 2,303,386 or in my co-pending application Serial No. 640,652, filed February 18, 1957, for "Brush Element and Belt Brush Construction," of which this application is a continuation-in-part.

In order to provide mounting means for such lengths of brush strip, I extrude continuous lengths of uncured elastomeric material such as neoprene (polychloroprene) or natural rubber compositions in the cross-section shown in FIG. 4 of the drawing, such extruded material being cut into proper lengths to conform to lengths of brush strip to be placed in the mold and cured. Such extruded elastomeric composition comprises a base portion 28, the underside of which may be flat or slightly concave. Lateral flange portion 29 and 30 project therefrom. A longitudinally extending central opening 31 is shaped and dimensioned to receive and fit the sheet metal brush strip back 32 with a narrower longitudinally extending slot 33 permitting protrusion of the layer of brush material 34 extending from such back. Lengths of brush strip are inserted within the corresponding lengths of extruded elastomeric material as shown in FIG. 5, the brush strip in this case being of the type disclosed in my Patent 2,303,386 and comprising a channelform sheet metal back 32 having teeth such as 35 and 36 punched in from the respective sides thereof to overlie and secure a wire 37 extending longitudinally within such back and about which the brush material is doubled for retention therein, such brush material being relatively densely packed within such back and flaring somewhat therebeyond as shown. When the brush strip and the extrusions into which they are inserted are placed in a mold as shown in FIG. 5 and the mold firmly closed thereon, a portion of the uncured elastomeric material at 38 and 39 overlying the lips of the channel back 32 is forced inwardly to mingle with the outer layers of the brush material. Consequently, the elastomeric material completely surrounds the brush strip back (including the ends thereof) and the layer of brush material, and penetrates into the spaces between strands of such brush material in the region near the brush strip back. When the mold is now heated in the usual manner, in an oven or otherwise, the elastomeric material on being heated first tends to swell somewhat, ensuring complete filling of the mold and expansion into the perforations and indentations in the channel back 32 left by punching in teeth 35 and 36, for example, assisting further to interlock the brush strip back and the molded elastomeric mounting therefor, and by such swelling the elastomer further penetrates into the layer of brush material in the region near the brush strip back and then on further heating it is cured in its final shape. The brush material is thus supported by resilient elastomeric material in the region immediately above the more rigid support of the sheet metal channel back.

The bottoms of the mold cavities may be slightly convex transversely of the lengths of elastomeric material placed therein so as to form corresponding shallow concave troughs T extending longitudinally of the undersides of the cured molded assemblies. When such assemblies are thereafter mounted on endless belts as indicated in FIG. 8, they are enabled to conform to belt flexing as the latter passes over pulleys 25 and 26 with a minimum of strain thereon. Moreover, they are adapted to be mounted on sleeves or hubs having circular, or substantially circular, surfaces.

The elongated molded elastomeric mountings 40 will ordinarily be bonded to the surface of endless belt 24 by means of appropriate adhesive material, with the elongated elements extending transversely of the belt as shown in FIG. 6. Such lengths of brush strip in their elastomeric mountings 40 may be spaced as desired but will frequently be placed relatively close together as shown in FIGS. 6 and 7, and supplemental attaching means may desirably be utilized such as the sheet metal channel 41 fitting between adjacent parallel elastomeric mountings 40 and overlying the respective side flange portions 29 and 30 thereof. Staples 42 and 43 may be utilized to secure such channel 41 to the belt 24. The channels 41 interposed between the adjacent parallel elastomeric mountings 40 not only serve as additional securing means but also brace the brush elements laterally to support them when the brush material 34 engages the work. Obviously, such channels 41 in no way interfere with flexing of belt 24 over the pulleys or rolls 25 and 26 inasmuch as the mountings 40 and the layers of brush material 34 will then extend substantially radially of the axis of rotation of the pulley.

Epoxy resin cements have been found especially suitable for bonding the elastomeric mountings 40 to the belts 24 whether the latter are of elastomeric material themselves or of sheet metal. If desired, the outer surface of the sheet metal channelform back 32 of the brush strip may be coated with epoxy resin cement prior to insertion within the extruded elastomeric strips, thereby serving further to bond such backs to the molded elastomeric mounting 40.

Any brush materials may be utilized depending upon the brushing operation to be performed, including crimped wire, plastic coated wire, plastic coated glass fibers, horsehair, tampico fiber, nylon bristles, plastic sheet material and textile fabric buff material such as cotton cloth. Granular abrasive such as emery, pumice and the like may be bonded to any of such brush materials or otherwise applied. While resiliently deformable elastomers are generally preferred to form the elongated molded bases or mountings 40 of the brush elements (brush strip), other more rigid plastics may also be employed.

It will be seen from the foregoing that I have provided a novel belt brush and method of manufacturing the same adapted to utilize conventional brush strip of the type commercially produced on automatic machinery such as the brush strip of my prior Patent 2,303,386. Furthermore, means is provided for securely mounting such brush strip on an endless belt or the like in a manner accommodating flexing of the belt in use. The brush strip is particularly effectively braced to support the forces developed when the brush material engages the work in use. If desired, the elastomeric material may be extruded directly on the brush strip back with such back passing through the extrusion die in a continuous length which may thereafter be cut into sections. The elastomeric material thus extruded may include a blowing compound adapted upon later heating in the FIG. 5 mold to form a sponge elastomeric composition (e.g. sponge neoprene) and to intrude such elastomeric composition into the brush material in the region adjacent the brush back. The flanges 29 and 30 may themselves be stapled directly to the belt, if desired.

As illustrated somewhat diagrammatically in FIG. 9 of the drawing, lengths of brush strip may be utilized which do not extend across the entire width of the belt 24 and which may be mounted on such belt in progressively offset or stepwise relationship as at 44, 45 and 46 so that the layers of brush material 34 may be considered arranged diagonally of the belt although each segment extends in a direction directly transverse of such belt. The resultant effect is accordingly very much like that of a rotary brush in which lengths of brush strip are deformed and mounted in long lead helices. Indeed, a belt having brush elements arranged thereon as shown in FIG. 9 may be formed into a closely fitting sleeve mounted upon a cylindrical core or hub to provide a rotary brush. under such circumstances and also when utilized in the usual manner as shown in FIG. 8, it will be appreciated that the belt may be flexed as required without the necessity of flexing the individual lengths of brush strip as would be required if the latter were arranged diagonally of the belt. Also, of course, elongated brush elements having molded elastomeric mountings 40 in accordance with this invention may be mounted directly on the outer cylindrical surface of an appropriate rotatable hub or core with such mountings extending parallel to the axis of rotation and with successive elements slightly offset circumferentially of the hub as above indicated in order to achieve a generally helical conformation without the necessity of bending or deforming such brush elements. The mountings 40 may in such cases desirably be concave at their under surfaces to fit the cylindrical surface of the hub or core 47. Adhesives may be employed to bond the brush strip mountings to the supporting surface to produce a rotary brush of the general type shown in diagrammatic FIG. 10. By arranging successive relatively short brush elements in offset manner as described above, a rotary brush is achieved which avoids the disadvantages of rotary brushes utilizing single lengths of brush strip extending the entire length of the brush strip parallel to the axis of rotation wherein the brush material of such single lengths of brush strip contacts the work surface all at one time, followed by a brief period during which no brush material of such a brush is in contact with the surface. At the same time, the difficulties of helically mounting and forming brush strip are avoided, and a relatively inexpensive brush is provided which avoids sudden heavy demands on the source of power and eliminates an important cause of vibration.

My new elongated brush elements are mounted around the circumference of the cylindrical core 47 spaced so that there are equal and usually quite small distances between them. A second circle of such brush elements is placed axially adjacent the first such circle but with the elements of the second circle offset circumferentially from those of the first circle. Thus, for a long brush comprising ten such circles, the offset in each case may be 1/10 of the distance from the center line of one strip to the center line of an adjacent strip of the same circle. Optionally, the direction of offset may be reversed at the mid-point of the brush to make the brush entirely symmetrical. Similar arrangements are obviously suitable for belt brushes also. When desired, reinforcing elements such as 41 may be employed when the elongated brush elements are mounted on the cylindrical cores.

Other modes of applying the principle of the invention may be employed, change being made as regards the details described, provided the features stated in any of the following claims or the equivalent of such be employed.

I therefore particularly point out and distinctly claim as my invention:

1. A belt brush comprising an endless belt and a plurality of lengths of brush strip secured thereto, said lengths of brush strip having back portions individually closely enclosed within corresponding strips of elastomeric material and extending transversely of said belt.

2. The belt brush of claim 1, wherein said elastomeric material is intruded into interstices of the brush material of said brush strip with the brush material protruding therefrom.

3. The belt brush of claim 1, including brace means secured to said belt intermediate adjacent lengths of brush strip and overlying said elastomeric material.

4. A belt brush comprising an endless belt and generally parallel strips of elastomeric material extending transversely thereof and secured thereto, lengths of brush strip embedded in said strips of elastomeric material with brush material extending therefrom, said strips of elastomeric material having side flange portions against said belt extending toward corresponding portions of adjacent elastomeric strips, and brace means secured to said belt overlying said flange portions and engaging the respective sides of said elastomeric strips to assist in supporting the latter against strains imposed thereon in use.

5. The belt brush of claim 4, wherein said brace means comprise sheet metal channel members having a base portion bearing against said flanges and outwardly extending side portions bearing against the sides of the adjacent elastomeric strips.

6. The belt brush of claim 4, wherein said brace means comprise sheet metal channel members having a base portion bearing against said flanges and outwardly extending side portions bearing against the sides of the adjacent elastomeric strips, and staples securing said sheet metal brace member to said belt.

7. A brush element having an elongated elastomeric back portion, and a layer of brush material extending therefrom, said back portion being transversely concave for its entire length on its side farthest removed from said brush material and having such concave surface mounted against the surface of a flexible belt, said back portion extending transversely of said belt.

8. A belt brush comprising a belt, a plurality of lengths of brush strip mounted thereon extending transversely of said belt, said brush strip having a sheet metal channel back with brush material secured therein and extending therefrom, and side flanges of elastomeric material bonded on said metal back secured to said belt and bracing said brush strip.

9. A brush comprising a rotatable cylindrical hub and a plurality of brush elements thereon, each said brush element comprising an elongated self-supporting back portion and a layer of brush material extending therefrom, said brush elements being arranged on said hub parallel to each other with said brush material extending outwardly and with the ends of axially successive back portions laterally offset in stepwise succession, said back portions extending parallel to the longitudinal axis of said hub and including outer elastomeric base portions of substantial width transversely concave to conform to said hub and adhered thereto.

10. A composite brush element comprising a length of brush strip having an elongated sheet metal channel back and a layer of brush material relatively densely packed and secured therein and flaring somewhat therebeyond, with such layer of brush material protruding outwardly a substantial distance beyond the lips of said channel back; and elastomeric material intruded into said layer of brush material substantially entirely in the region where said brush material extends immediately beyond said channel lips, whereby said brush material is resiliently supported in said region while said brush material extends freely therebeyond and substantially no space within said back is occupied by said elastomeric material.

11. A brush element comprising a rigid back having a hollow brush bristle receiving portion, a body of brush bristles packed within said back and extending outwardly therefrom, and elastomeric material intruded into said body of bristles substantially entirely in the region where said body of brush bristles extends immediately beyond said back, whereby said body of brush bristles is resiliently supported in said region while said bristles extend freely therebeyond and substantially no space within said back is occupied by said elastomeric material.

References Cited in the file of this patent

UNITED STATES PATENTS

| Number | Name | Date |
|---|---|---|
| 827,965 | Engel | Aug. 7, 1906 |
| 1,141,863 | Bausman | June 1, 1915 |
| 1,535,628 | Peterson | Apr. 28, 1925 |
| 1,882,270 | Beach | Oct. 11, 1932 |
| 2,135,885 | Dow | Nov. 8, 1938 |
| 2,172,433 | Churchhill | Sept. 12, 1939 |
| 2,181,676 | Wheeler | Nov. 28, 1939 |
| 2,261,768 | Jones | Nov. 4, 1941 |
| 2,271,553 | Smellie | Feb. 3, 1942 |
| 2,303,386 | Peterson | Dec. 1, 1942 |
| 2,576,546 | Starr | Nov. 27, 1951 |
| 2,714,738 | Peterson | Aug. 9, 1955 |
| 2,753,580 | Lombardi | July 10, 1956 |
| 2,758,331 | Gerber | Aug. 14, 1956 |
| 2,783,095 | Ballard | Feb. 26, 1957 |
| 2,878,502 | Johnson | Mar. 24, 1959 |
| 2,950,495 | Stingley | Aug. 30, 1960 |

FOREIGN PATENTS

| Number | Country | Date |
|---|---|---|
| 991,863 | France | Oct. 11, 1951 |